US012732061B2

(12) United States Patent
Chavez et al.

(10) Patent No.: US 12,732,061 B2
(45) Date of Patent: Sep. 8, 2026

(54) ELECTRIC MOTOR WITH ADJUSTMENT FLANGE BETWEEN MOTOR AND A LOAD

(71) Applicant: ABB Schweiz AG, Baden (CH)

(72) Inventors: Carlos Chavez, Helsinki (FI); Juha Jokinen, Helsinki (FI); Timo Holopainen, Helsinki (FI); Derrick Vigil, Greer, SC (US)

(73) Assignee: ABB SCHWEIZ AG, Baden (CH)

( * ) Notice: Subject to any disclaimer, the term of this patent is extended or adjusted under 35 U.S.C. 154(b) by 211 days.

(21) Appl. No.: 18/503,887

(22) Filed: Nov. 7, 2023

(65) Prior Publication Data

US 2025/0149952 A1 May 8, 2025

(51) Int. Cl.
*H02K 5/26* (2006.01)
*H02K 7/04* (2006.01)

(52) U.S. Cl.
CPC ................ *H02K 5/26* (2013.01); *H02K 7/04* (2013.01)

(58) Field of Classification Search
CPC .. H02K 5/24; H02K 5/26; H02K 5/16; H02K 5/15; H02K 5/22; H02K 7/04; H02K 7/14; H02K 2213/09; H02K 15/14; F16M 1/04; F16M 1/08
USPC .......................................... 310/91, 418, 428
See application file for complete search history.

(56) References Cited

U.S. PATENT DOCUMENTS 5,258,675 A * 11/1993 Nelessen ................. H02K 7/20 310/91
5,281,878 A * 1/1994 Schaeffer ................ H02K 7/14 310/91
9,869,316 B2 * 1/2018 Drechsel ................ F04D 25/06
11,025,131 B2 * 6/2021 Barekar .................. F02B 63/00
11,837,935 B2 * 12/2023 Jefferies ............... H02K 15/085
2002/0079420 A1 * 6/2002 Arnold ..................... H02K 5/24 248/672
2012/0215389 A1 * 8/2012 Perry ....................... H02K 7/14 903/903
2013/0115118 A1 * 5/2013 Chien ................ F04D 13/0633 417/420
2016/0036291 A1 * 2/2016 Yabe .................... B60K 7/0007 310/89
2019/0305656 A1 * 10/2019 Kobayashi ............. H02K 5/225
2023/0170760 A1 * 6/2023 Kuo ....................... H02K 21/16 310/89

* cited by examiner

*Primary Examiner* — Maged M Almawri
(74) *Attorney, Agent, or Firm* — Greenberg Traurig, LLP

(57) ABSTRACT

A field of electric motors, such as electric motors and electric generators for industrial applications, and more particularly to an electric motor. The electric motor of the present invention includes a rotor including a shaft and a rotor core supported on the shaft, a stator surrounding the rotor, a motor frame surrounding the stator and including a first end plate at a drive end of the electric motor, and a bearing shield attached to the first end plate, wherein a non-drive end of the electric motor is supported by a non-drive end supporting foundation, and a drive end of the electric motor is configured to be mounted together with a load with help of an adjustment flange, and wherein the electric motor further includes at least three threaded adjustment pieces fixed to the bearing shield or to the adjustment flange, and at least three threaded adjustment screws, each of the adjustment screws configured for being driven through a respective threaded adjustment piece and for moving the adjustment flange radially.

12 Claims, 8 Drawing Sheets

ELECTRIC MOTOR WITH ADJUSTMENT FLANGE BETWEEN MOTOR AND A LOAD

TECHNICAL FIELD

The present invention relates to the field of electric motors, such as electric motors and electric generators for industrial applications, and more particularly to an electric motor.

BACKGROUND

Electric motors are used in industry for different applications, such as electric motors within the transportation industry, within the process and manufacturing industry as well as within the energy industry. An electric motor converts electrical energy into mechanical energy. Most electric motors operate through the interaction of magnetic fields and current-carrying conductors to generate force. Electric motors are found in applications as diverse as industrial applications, small and medium size industrial motors of highly standardized dimensions and characteristics provide convenient mechanical power for industrial uses. Larger electric motors are used for propulsion of ships in ship propulsion unit applications of the marine industry, for pipeline compressors, and for water pumps with ratings in the millions of watts.

The electric motor comprises a rotor comprising a shaft and a rotor core supported on the shaft, a stator surrounding the rotor, and a motor frame surrounding the stator. The shaft is typically supported with bearing arrangements on both ends of the motor, i.e. on a drive end of the motor and on a non-drive end of the motor. In most applications the motor frame of the electric motor is mounted on a supporting foundation near the load. However, in some applications the mounting of the electric motor has to be carried out so that the supporting foundation is available only for the non-drive end of the electric motor.

In applications where the supporting foundation is available only for the non-drive end of the electric motor the mounting of said electric motor has to be carried out so that the drive end of the electric motor is supported to the load frame with help of an adapter flange.

The problem with applications where the support for the electric motor drive end is available only via an adapter flange to the load frame is that the alignment of the motor shaft line with the load shaft line is a very challenging and problematic task. In the alignment of the motor and the load shaft lines, both the load and motor shafts must first be separately well-aligned with respect to the adapter flange and confirmed by the locking pins. Later, the alignment typically has to be corrected when the motor and the load are mounted together at factory facilities or in situ.

In principle, the well-aligned motor and compressor can be mounted together by the mating adapter flanges without any additional actions. In practice, the alignment adjustment is often needed due to tolerances and system flexibility. For example, the sagging of the motor-load system affects the alignment.

Furthermore, in large motors, the alignment is affected by the flexibility of the adapter flange and motor frame structures. Thus, at first the alignment of the motor shaft with respect to the adapter flange must be carried out by supporting the motor from the adapter flange and from the motor feet at the non-drive end of the electric motor. The adapter flange is mounted to the drive-end bearing shield. The alignment has to be carried out by moving the adapter flange radially with respect to the bearing shield. As a well-aligned position is reached, locking pins are used to locate permanently the proper position.

The alignment of whole system is very difficult and problematic because the flange-shield connection that is used for the alignment also carries the weight of the whole system. In this phase, the locking pins must be removed to allow a new alignment position. This system alignment would typically also require the drilling of new pin holes.

In principle, there are two traditional solutions for the alignment challenge. First, the stiffness of the structures can be increased to reduce deformations, and second, tighter manufacturing tolerances can be applied to reduce alignment error. However, these solutions increase the weight of the components and increase the manufacturing costs.

There is a demand in the market for an electric motor solution which would allow aligning the motor with the load in applications where the mounting of the electric motor has to be carried out so that the supporting foundation is available only for the non-drive end of the electric motor.

SUMMARY

The object of the invention is to introduce an electric motor, which would provide a solution for aligning the motor with the load in applications where the mounting of the electric motor has to be carried out so that the supporting foundation is available only for the non-drive end of the electric motor. Advantageous embodiments are furthermore presented.

It is brought forward a new electric motor which comprises: a rotor comprising a shaft and a rotor core supported on the shaft; a stator surrounding the rotor; a motor frame surrounding the stator and comprising a first end plate at a drive end of said electric motor; and a bearing shield attached to said first end plate, wherein a non-drive end of said electric motor is supported by a non-drive end supporting foundation, and a drive end of said electric motor is configured to be mounted together with a load with help of an adjustment flange, and wherein said electric motor further comprises at least three threaded adjustment pieces fixed to said bearing shield or to said adjustment flange; and at least three threaded adjustment screws, each of said adjustment screws configured for being driven through a respective threaded adjustment piece and for moving said adjustment flange radially.

In a preferred embodiment, said electric motor further comprises an adjustment flange mounted to said first end plate at the drive end of said electric motor with mounting bolts.

In a preferred embodiment, said at least three threaded adjustment pieces are fixed to said bearing shield or to said adjustment flange with the help of fixing screws.

In a preferred embodiment, said at least three threaded adjustment pieces are welded to said bearing shield or to said adjustment flange.

In a preferred embodiment, said at least three threaded adjustment pieces comprise two threaded adjustment pieces arranged in vertical direction and two threaded adjustment pieces arranged in horizontal direction.

In a preferred embodiment, said at least three threaded adjustment pieces comprise eight threaded adjustment pieces.

In a preferred embodiment, said at least three threaded adjustment pieces comprise one threaded adjustment piece for each axial beam of said adjustment flange.

In a preferred embodiment, said at least three threaded adjustment pieces are fixed to said bearing shield, and wherein said electric motor further comprises at least three respective contact pieces fixed to the adjustment flange.

In a preferred embodiment, said at least three threaded adjustment pieces are fixed to said adjustment flange, and wherein said electric motor further comprises at least three respective contact pieces fixed to said bearing shield.

In a preferred embodiment, said adjustment screws are arranged as radial screws.

In a preferred embodiment, said adjustment screws are arranged as radial screws with a fine thread pitch.

It is brought forward a new method for aligning a load with an electric motor of the invention, said method comprising: mounting an adjustment flange to said electric motor; measuring required alignment correction from a shaft of said electric motor; calculating applied adjustment for each utilized adjustment piece based on said measured required alignment correction; loosening the mounting bolts of said adjustment flange slightly to allow radial movement of said adjustment flange; adjusting the adjustment screws of each of said utilized threaded adjustment pieces in accordance with said calculated adjustments for moving said adjustment flange radially; and tightening the mounting bolts of said adjustment flange for securing said adjustment flange.

In a preferred embodiment, said required alignment correction is measured with the help of a laser based measurement and alignment system.

In a preferred embodiment, in said calculating a required rotational angle for each individual screw is calculated based on said measured required radial displacement of said adjustment flange.

In a preferred embodiment, said method comprises removing said at least three threaded adjustment pieces from said bearing shield or from said adjustment flange.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

In the following, the invention will be described in greater detail by means of preferred embodiments with reference to the accompanying drawings of FIGS. 1 to 10.

DETAILED DESCRIPTION

The following embodiments are exemplary. Although the description may refer to "an", "one", or "some" embodiment(s) in several locations, this does not necessarily mean that each such reference is to the same embodiment(s), or that the feature only applies to a single embodiment, for example. Single features of different embodiments may also be combined to provide other embodiments. Generally, all terms and expressions used should be interpreted broadly and they are intended to illustrate, not to restrict, the embodiments. The figures only show components necessary for understanding the various embodiments. The number and/or shape of the various elements, and generally their implementation, could vary from the examples shown in the figures. The application of the various embodiments described herein is not limited to any specific system, but it can be used in connection with various applications where the mounting of the electric motor has to be carried out so that the supporting foundation is available only for the non-drive end of the electric motor.

The electric motor of the present invention comprises: a rotor comprising a shaft and a rotor core supported on the shaft; a stator surrounding the rotor; a motor frame surrounding the stator and comprising a first end plate at a drive end of said electric motor; and a bearing shield attached to said first end plate, wherein a non-drive end of said electric motor is supported by a non-drive end supporting foundation, and a drive end of said electric motor is configured to be mounted together with a load with help of an adjustment flange, and wherein said electric motor further comprises at least three threaded adjustment pieces fixed to said bearing shield or to said adjustment flange; and at least three threaded adjustment screws, each of said adjustment screws configured for being driven through a respective threaded adjustment piece and for moving said adjustment flange radially.

When referring to "threaded adjustment pieces", in this application it is meant to comprise any form of small metal block elements comprising a threaded lead-through opening. When referring to "threaded adjustment screws", in this application is meant to comprise any form of threaded screw, threaded bolt or threaded element suited for being driven through a threaded adjustment piece.

Figure 1:
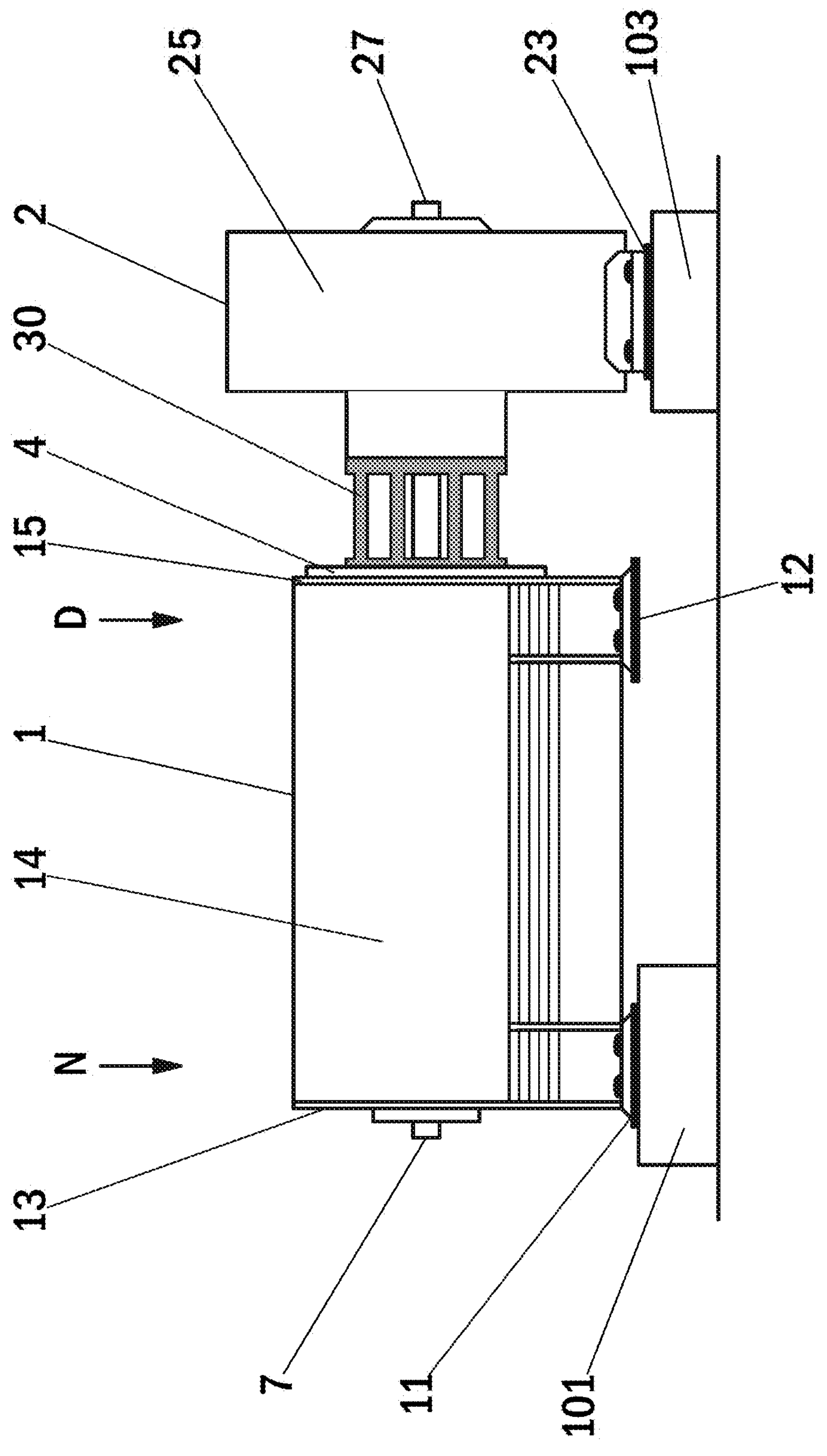
FIG. 1 shows an exemplary installation arrangement of one embodiment of an electric motor according to the present invention.

FIG. 1 shows an exemplary installation arrangement of one embodiment of an electric motor according to the present invention. The presented installation arrangement comprises a motor 1, a load 2 and an adjustment flange 30. Said motor 1 comprises a shaft 7, a rotor being supported on the shaft 7, a stator surrounding the rotor, a motor frame 13-15 surrounding the stator, and a bearing shield 4 attached to a drive end D of the motor frame 13-15. In FIG. 1 the non-drive end is marked with a letter N and the drive end is marked with a letter D.

Said motor frame 13-15 comprises a casing 14 and end plates 13, 15 being attached to said casing 14 at opposite axial ends of the frame, the shaft being supported with a first bearing arrangement on a first end plate 15 at a drive end D of the electric motor and with a second bearing arrangement on a second end plate 13 at a non-drive end N of said motor 1. Said adjustment flange 30 connects the motor frame 13-15 to the frame 25 of said load 2. In the presented installation arrangement the electric motor 1 has non-drive end supporting foundation 101 available only for the non-drive end N of the electric motor 1. The load 2 may be a compressor 2.

As presented in FIG. 1 the motor feet 11 at the non-drive end N of the electric motor 1 are supported by said non-drive end supporting foundation 101. Respectively, the motor feet 12 at the drive end D of the electric motor are unsupported. As presented in FIG. 1 the drive end D of the electric motor is supported to the load 2 via an adjustment flange 30, which adjustment flange 30 connects the frame of said motor 1 to the load frame 25. As presented in FIG. 1 the load feet 23 of the load 2 are supported by a load supporting foundation 103. In the process of mounting the electric motor 1 together with the load 2 with help of the adjustment flange 30 the shaft 7 of the electric motor 1 is first aligned with a load shaft 27 of the load 2 after which the shaft 7 of the electric motor 1 and the load shaft 27 are coupled together.

Figure 2:
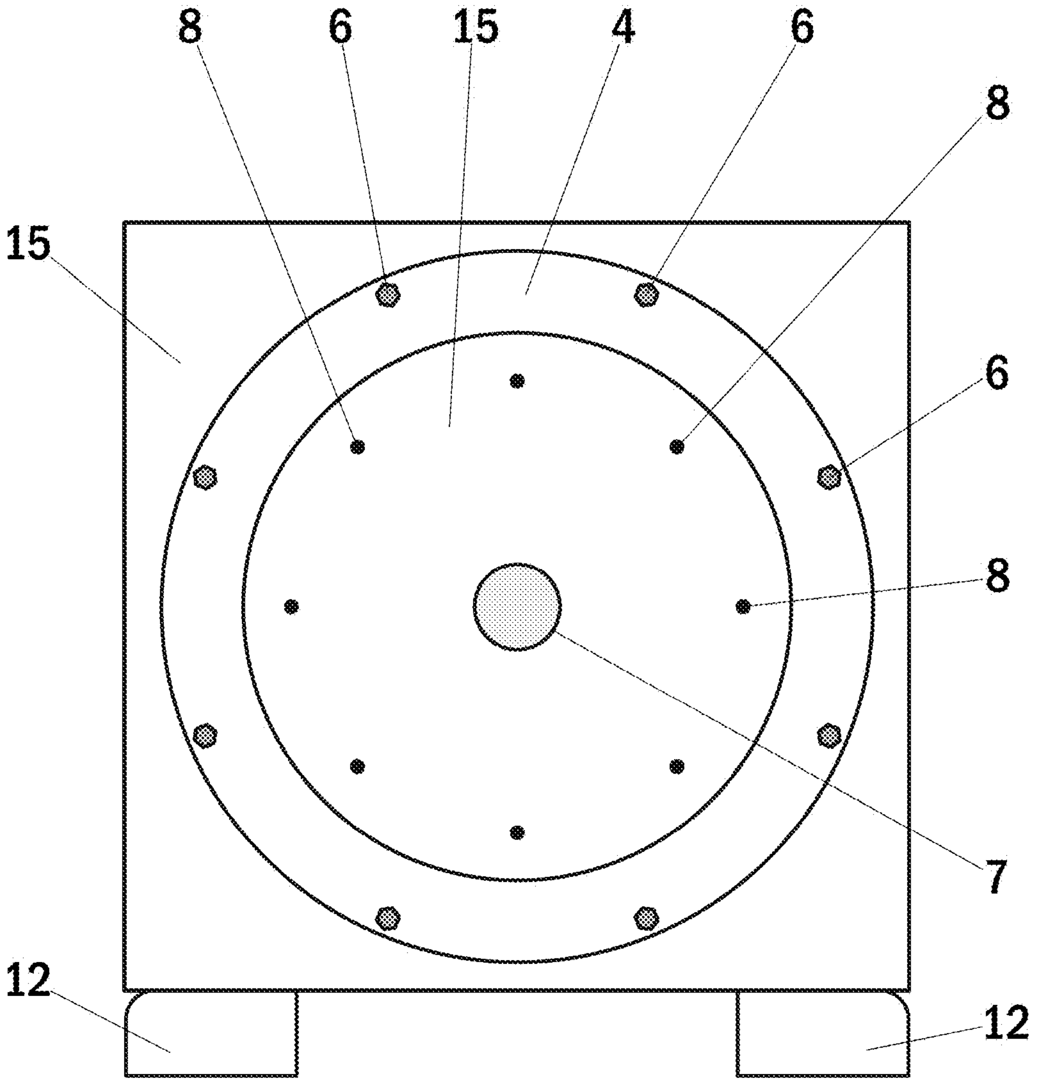
FIG. 2 shows an exemplary illustration of one embodiment of a drive end of an electric motor according to the present invention.

FIG. 2 shows an exemplary illustration of one embodiment of a drive end of an electric motor according to the present invention. The motor frame 13-15 of said electric motor according to the presented embodiment comprises a casing 14 and end plates 13, 15 being attached to said casing 14 at opposite axial ends of the frame. In FIG. 2 a first end plate 15 at a drive end D of the electric motor is shown. Said first end plate 15 comprises a bearing shield 4 attached to said first end plate 15 with attachment bolts 6. Said first end plate 15 also comprises a number of threaded holes 8 arranged receiving attachment bolts for attaching and connecting an adjustment flange 3 to said first end plate 15 at the drive end D of the electric motor. The shaft 7 of the motor is marked with a reference number 7.

Figure 3:
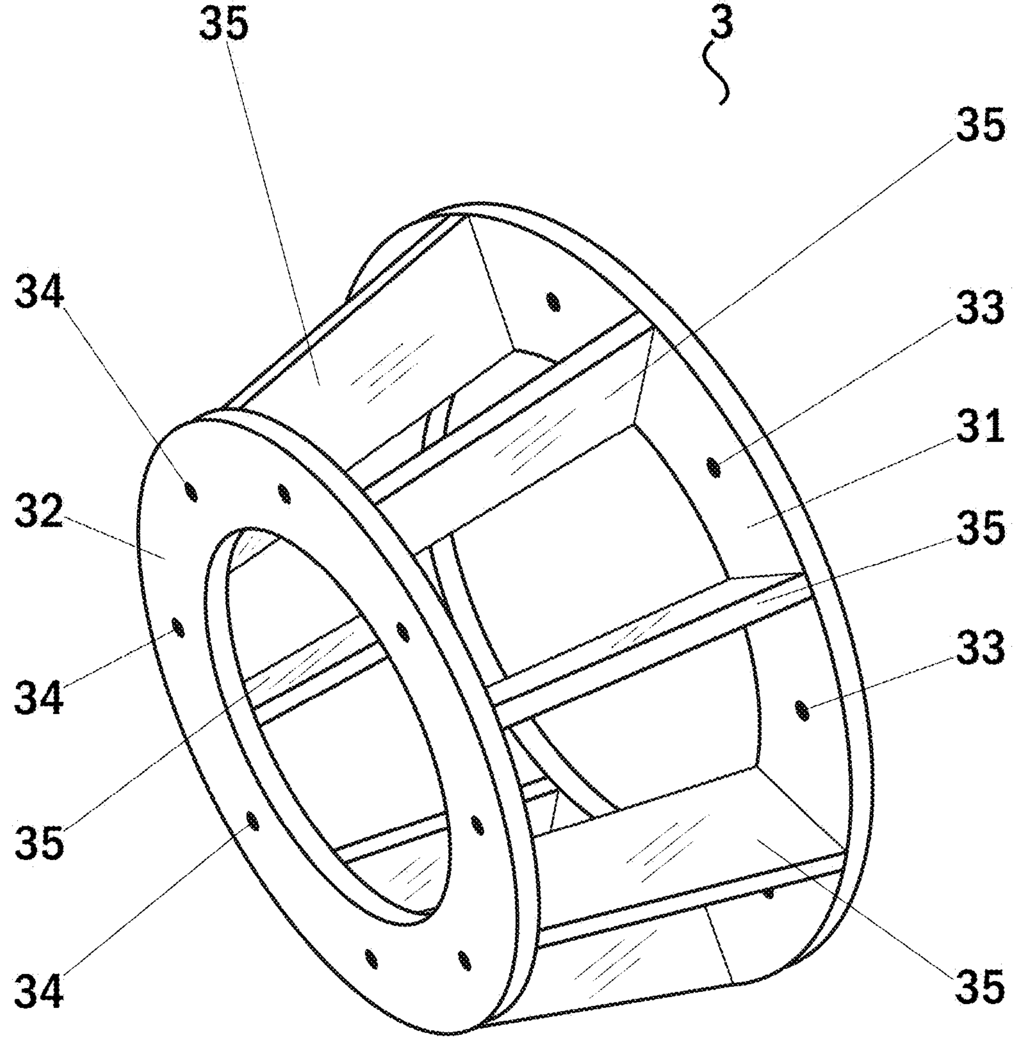
FIG. 3 shows an exemplary illustration of one embodiment of an adjustment flange of an electric motor according to the present invention.

FIG. 3 shows an exemplary illustration of one embodiment of an adjustment flange of an electric motor according to the present invention. The presented embodiment of an adjustment flange 3 comprises two annular end portions 31, 32 being joined together with a number of axial beams 35, one end of each of said axial beams 35 joining a first annular end portion 31 and another opposite end of each of said axial beams 35 joining a second annular end portion 32. Said two annular end portions 31, 32 of said adjustment flange 3 may have different diameters as shown in FIG. 3. Alternatively, said two annular end portions 31, 32 of an adjustment flange 30 may have same diameters as depicted in FIG. 1.

The first annular end portion 31 of said adjustment flange 3 comprises a number of holes 33 arranged for receiving mounting bolts for mounting said adjustment flange 3 to the first end plate 15 at the drive end D of the electric motor. Respectively, the second annular end portion 32 of said adjustment flange 3 comprises a number of holes 34 arranged for receiving mounting bolts for mounting said adjustment flange 3 to the load frame 25.

Figure 4:
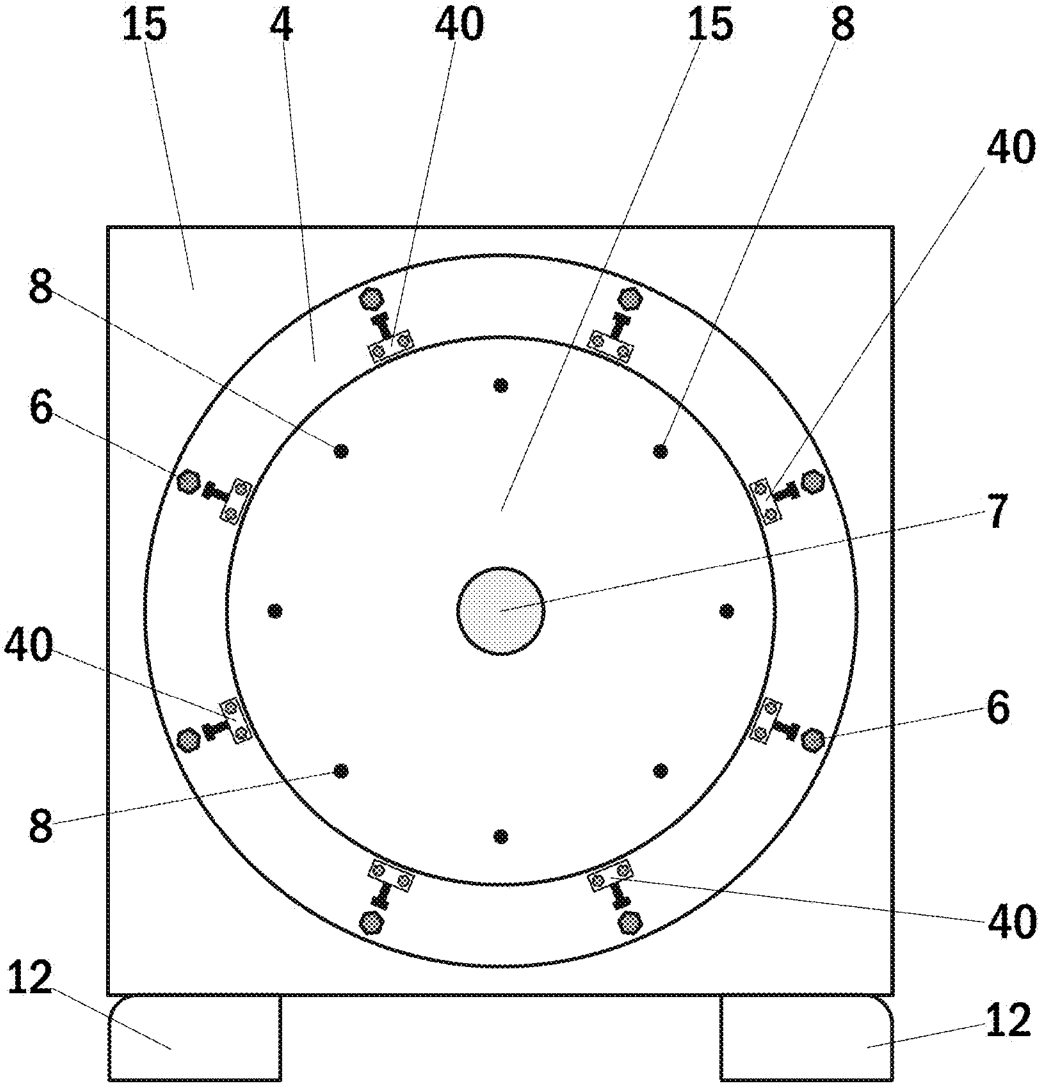
FIG. 4 shows an exemplary illustration of one embodiment of a drive end of an electric motor according to the present invention without an adjustment flange.

FIG. 4 shows an exemplary illustration of one embodiment of a drive end of an electric motor according to the present invention without an adjustment flange. The motor frame of said electric motor 1 according to the present embodiment comprises a casing and end plates being attached to said casing at opposite axial ends of the frame. In FIG. 4 a first end plate 15 at a drive end D of the electric motor 1 is shown. Said first end plate 15 comprises a bearing shield 4 attached to said first end plate 15 with attachment bolts 6.

In FIG. 4 said embodiment of a drive end of an electric motor according to the present invention is shown without an adjustment flange 3. Said first end plate 15 also comprises a number of threaded holes 8 arranged for receiving mounting bolts for mounting an adjustment flange 3 to said first end plate 15 at the drive end D of the electric motor. The shaft 7 of the motor is marked with a reference number 7. Also, the unsupported motor feet 12 at the drive end D of the electric motor are marked with a reference number 12.

The electric motor according to the present embodiment comprises at least three threaded adjustment pieces 40 fixed to the bearing shield 4. In the presented embodiment each threaded adjustment piece 40 of said at least three threaded adjustment pieces 40 is fixed to the bearing shield 4 of the electric motor with the help of two fixing screws. The presented embodiment comprises eight threaded adjustment pieces 40 fixed to the bearing shield 4. In an alternative embodiment each threaded adjustment piece 40 of said at least three threaded adjustment pieces 40 may be welded to the bearing shield 4 of the electric motor. In the presented embodiment each of said threaded adjustment pieces 40 comprises an adjustment screw arranged for adjusting the distance between an adjustment flange 3 and the bearing shield 4 attached to the first end plate 15 at a drive end D of the electric motor 1. The adjustment screws of said threaded adjustment pieces 40 are arranged as radial screws for radial adjustment of the adjustment flange 3. In the presented embodiment said radial screws may be arranged with a fine thread pitch for enhancing the adjustment, i.e. a thread pitch of 1.25 mm or less.

Figure 5:
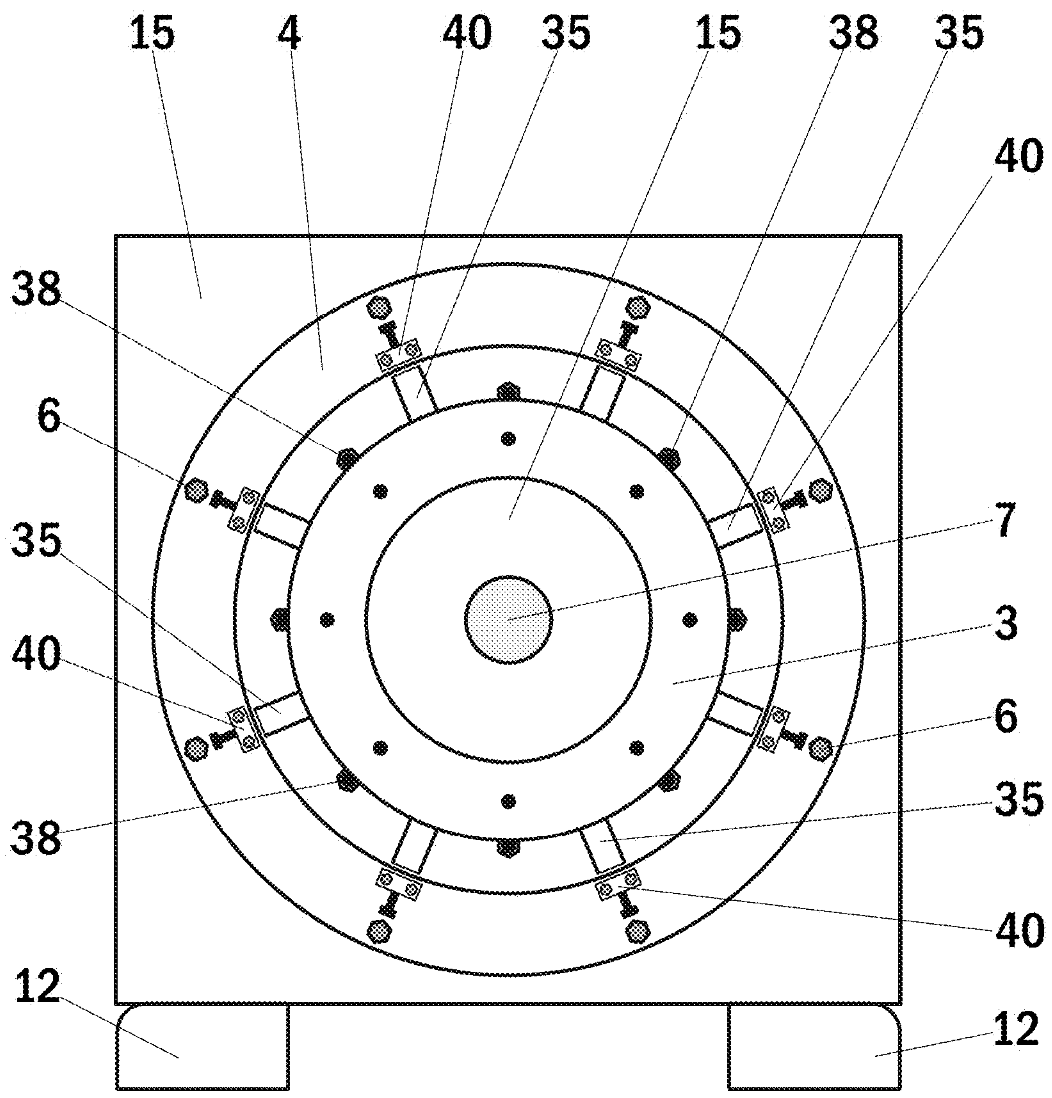
FIG. 5 shows an exemplary illustration of one embodiment of a drive end of an electric motor according to the present invention accompanied with an adjustment flange.

FIG. 5 shows an exemplary illustration of one embodiment of a drive end of an electric motor according to the present invention accompanied with an adjustment flange. The motor frame of said electric motor according to the present embodiment comprises a casing and end plates being attached to said casing at opposite axial ends of the frame. In FIG. 4 a first end plate 15 at a drive end D of the electric motor is shown. Said first end plate 15 comprises a bearing shield 4 attached to said first end plate 15 with attachment bolts 6.

In FIG. 5 said embodiment of a drive end of an electric motor according to the present invention is shown accompanied with an adjustment flange 3. Said adjustment flange 3 is mounted to said first end plate 15 at the drive end D of the electric motor with mounting bolts 38. Said mounting bolts 38 are used for securing a first annular end portion 31 of said adjustment flange 3 to the first end plate 15 through a number of holes in said first annular end portion 31 to a number of threaded holes 8 in said first end plate 15. The shaft 7 of the motor is marked with a reference number 7. Also, the unsupported motor feet 12 at the drive end D of the electric motor are marked with a reference number 12.

The electric motor according to the present embodiment comprises at least three threaded adjustment pieces 40 fixed to the bearing shield 4. In the presented embodiment each threaded adjustment piece 40 of said at least three threaded adjustment pieces 40 is fixed to the bearing shield 4 of the electric motor with the help of two fixing screws. The presented embodiment comprises eight threaded adjustment pieces 40 fixed to the bearing shield 4. In an alternative embodiment each threaded adjustment piece 40 of said at least three threaded adjustment pieces 40 may be welded to the bearing shield 4 of the electric motor. In the presented embodiment each of said threaded adjustment pieces 40 comprises an adjustment screw arranged for adjusting the distance between an adjustment flange 3 and the bearing shield 4 attached to the first end plate 15 at a drive end D of the electric motor 1.

The adjustment piece 40 comprises a small block 40 that is fixed to the bearing shield 4 and an adjustment screw through this block 40. The head of the adjustment screw is against the flange. The adjustment screws of said threaded adjustment pieces 40 are arranged as radial screws for radial adjustment of the adjustment flange 3. The presented embodiment comprises eight threaded adjustment pieces 40 fixed to the bearing shield 4, i.e. one threaded adjustment piece 40 with an adjustment screw for each axial beam 35 of said adjustment flange 3.

In an alternative embodiment said electric motor comprises four threaded adjustment pieces 40 of which two threaded adjustment pieces 40 are arranged in vertical direction and two threaded adjustment pieces 40 are arranged in horizontal direction.

With the help of each of said threaded adjustment pieces 40 according to the embodiment the distance between the adjustment flange 3 and the bearing shield 4 near said threaded adjustment piece 40 can be adjusted. In said adjustment procedure first the mounting bolts 38 of said adjustment flange 3 are slightly loosened to allow radial movement of the adjustment flange 3. Thereafter one or more threaded adjustment pieces 40 are selected on sides where distance between the adjustment flange 3 and the bearing shield 4 is to be increased.

After this the adjustment screws of each of said selected threaded adjustment pieces 40 are screwed and adjusted so that said adjustment screws first contact a respective axial beam 35 of said adjustment flange 3 and then further move the adjustment flange 3 to an alignment position.

Figure 6:
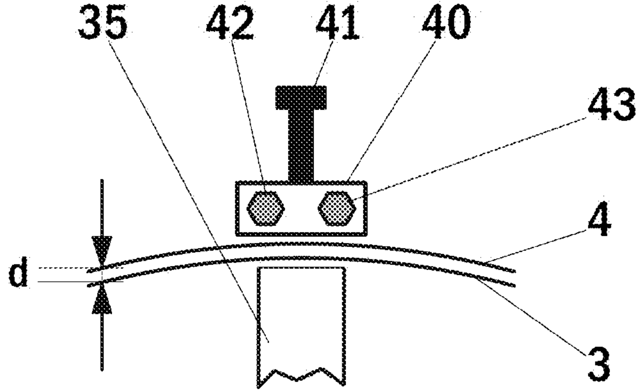
FIG. 6 shows a top view of an embodiment of a threaded adjustment piece of an electric motor according to the present invention.

FIG. 6 shows a top view of an embodiment of a threaded adjustment piece of an electric motor according to the present invention. In the presented embodiment a threaded adjustment piece 40 is fixed to the bearing shield 4 of the electric motor with the help of two fixing screws 42, 43. In an alternative embodiment a threaded adjustment piece 40 may be welded to the bearing shield 4 of the electric motor. In the presented embodiment a threaded adjustment piece 40 comprises an adjustment screw 41 arranged for adjusting the distance d between the adjustment flange 3 and the bearing shield 4 attached to the first end plate 15 at a drive end D of the electric motor 1. The adjustment piece 40 comprises a small block 40 that is fixed to the bearing shield 4 and an adjustment screw 41 through this block 40. The head of the adjustment screw 41 is against the flange. The adjustment screws 41 of each of said threaded adjustment pieces 40 are arranged as radial screws for radial adjustment of the adjustment flange 3. In the presented embodiment said radial screws 41 may be arranged with a fine thread pitch for enhancing the adjustment, i.e. a thread pitch of 1.25 mm or less.

With the help of the threaded adjustment piece 40 according to the embodiment the distance d between the adjustment flange 3 and the bearing shield 4 can be adjusted. In said adjustment procedure first the mounting bolts 38 of said adjustment flange 3 are slightly loosened to allow radial movement of the adjustment flange 3. Thereafter said adjustment screw 41 of said threaded adjustment piece 40 is screwed and adjusted so that said adjustment screw 41 first contacts a respective axial beam 35 of said adjustment flange 3 and then further moves the adjustment flange 3 so that the distance d between the adjustment flange 3 and the bearing shield 4 increases to an alignment position.

Figure 7:
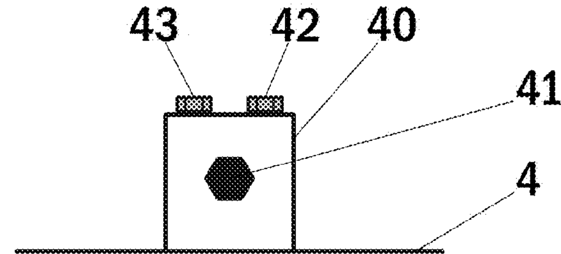
FIG. 7 shows a side view of an embodiment of a threaded adjustment piece of an electric motor according to the present invention.

FIG. 7 shows a side view of an embodiment of a threaded adjustment piece of an electric motor according to the present invention. In the presented embodiment a threaded adjustment piece 40 is fixed to the bearing shield 4 of the electric motor with the help of two fixing screws 42, 43. In the presented embodiment a threaded adjustment piece 40 comprises an adjustment screw 41 arranged for adjusting the distance d between the adjustment flange 3 and the bearing shield 4 attached to the first end plate 15 at a drive end D of the electric motor 1. The adjustment screws 41 of each of said threaded adjustment pieces 40 are arranged as radial screws for radial adjustment of the adjustment flange 3. In the presented embodiment said radial screws 41 may be arranged with a fine thread pitch for enhancing the adjustment, i.e. a thread pitch of 1.25 mm or less.

Figure 8:
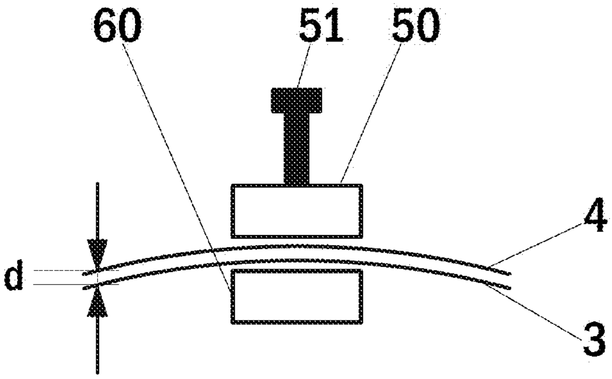
FIG. 8 shows a top view of another embodiment of a threaded adjustment piece of an electric motor according to the present invention.

FIG. 8 shows a top view of an embodiment of a threaded adjustment piece of an electric motor according to the present invention. In the presented embodiment a threaded adjustment piece 50 is welded to the bearing shield 4 of the electric motor and a respective contact piece 60 is welded to the adjustment flange 3. In the presented embodiment a threaded adjustment piece 40 comprises an adjustment screw 51 arranged for adjusting the distance d between the adjustment flange 3 and the bearing shield 4 attached to the first end plate 15 at a drive end D of the electric motor 1. The adjustment piece 50 comprises a small block 50 that is fixed to the bearing shield 4 and an adjustment screw 51 through this block 50. The head of the adjustment screw 41 is against the flange. The adjustment screws 51 of each of said threaded adjustment pieces 50 are arranged as radial screws for radial adjustment of the adjustment flange 3. In the presented embodiment said radial screws 51 may be arranged with a fine thread pitch for enhancing the adjustment, i.e. a thread pitch of 1.25 mm or less.

With the help of the threaded adjustment piece 50 and the respective contact piece 60 according to the embodiment the distance d between the adjustment flange 3 and the bearing shield 4 can be adjusted. In said adjustment procedure first the mounting bolts 38 of said adjustment flange 3 are slightly loosened to allow radial movement of the adjustment flange 3. Thereafter said adjustment screw 51 of said threaded adjustment piece 50 is screwed and adjusted so that said adjustment screw 51 first contacts said respective contact piece 60 in said adjustment flange 3 and then further moves the adjustment flange 3 so that the distance d between the adjustment flange 3 and the bearing shield 4 increases to an alignment position.

Figure 9:
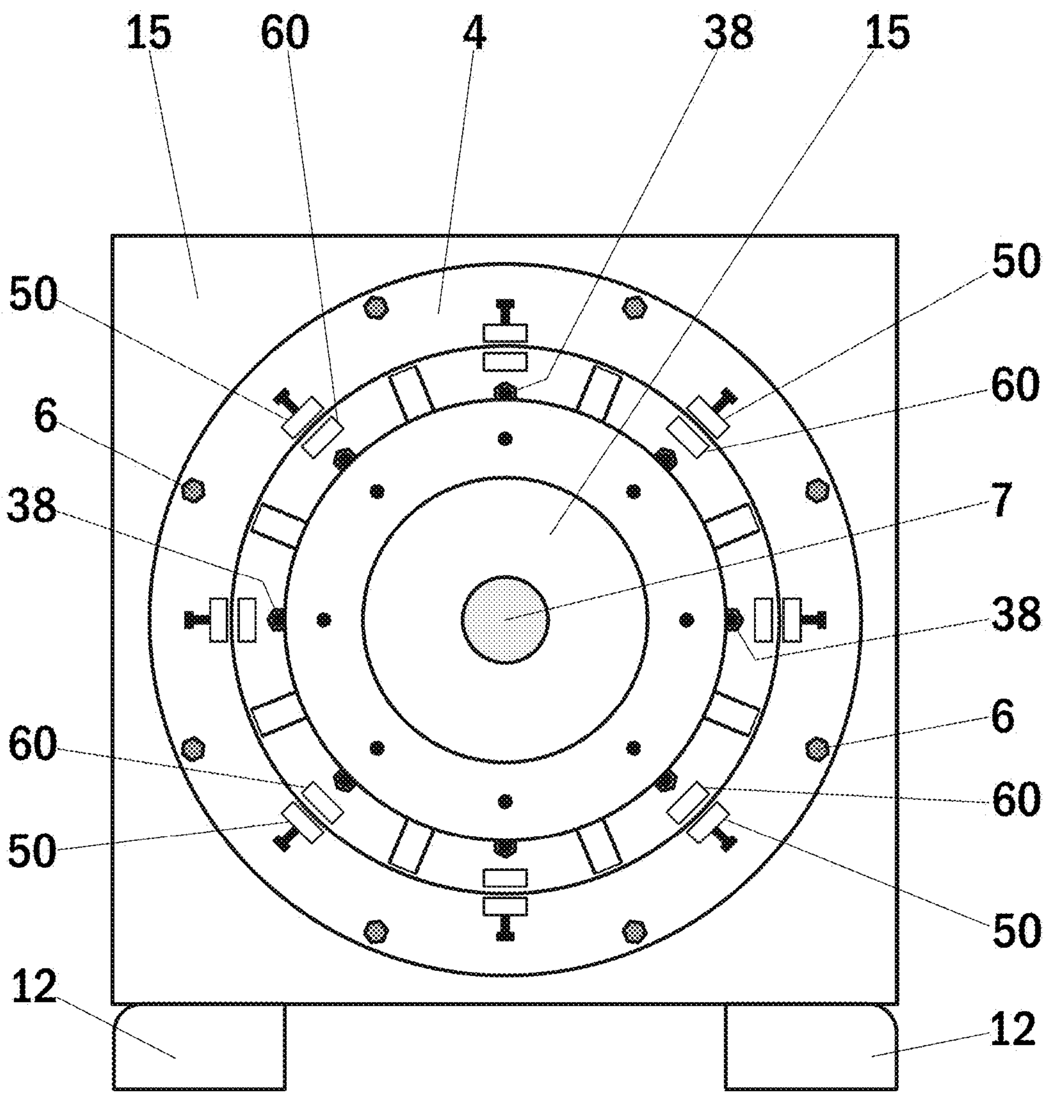
FIG. 9 shows an exemplary illustration of another embodiment of a drive end of an electric motor according to the present invention accompanied with an adjustment flange.

FIG. 9 shows an exemplary illustration of another embodiment of a drive end of an electric motor according to the present invention accompanied with an adjustment flange. The motor frame of said electric motor according to the present embodiment comprises a casing and end plates being attached to said casing at opposite axial ends of the frame. In FIG. 9 a first end plate 15 at a drive end D of the electric motor is shown. Said first end plate 15 comprises a bearing shield 4 attached to said first end plate 15 with attachment bolts 6 and an adjustment flange 3 mounted to said first end plate 15 with mounting bolts 38. Said mounting bolts 38 are used for securing a first annular end portion 31 of said adjustment flange 3 to the first end plate 15 through a number of holes 33 in said first annular end portion 31 to a number of threaded holes 8 in said first end plate 15. The shaft 7 of the motor is marked with a reference number 7. Also, the unsupported motor feet 12 at the drive end D of the electric motor are marked with a reference number 12.

The electric motor 1 according to the presented another embodiment comprises at least three threaded adjustment pieces 50 welded to the bearing shield 4 and at least three respective contact pieces 60 welded to the adjustment flange 3. In an alternative embodiment of the present invention said electric motor 1 comprises at least three threaded adjustment pieces 50 welded to the adjustment flange 3 and at least three respective contact pieces 60 welded to the bearing shield 4.

The presented embodiment comprises eight threaded adjustment pieces 50 welded to the bearing shield 4 and eight respective contact pieces 60 welded to the adjustment flange 3. In the presented embodiment each of said threaded adjustment pieces 50 comprises an adjustment screw 51 arranged for adjusting the distance between an adjustment flange 3 and the bearing shield 4 attached to the first end plate 15 at a drive end D of the electric motor 1. The adjustment screws 51 of said threaded adjustment pieces 50 are arranged as radial screws 51 for radial adjustment of the adjustment flange 3. In the presented embodiment said radial screws 51 may be arranged with a fine thread pitch for enhancing the adjustment, i.e. a thread pitch of 1.25 mm or less.

In an alternative embodiment said electric motor comprises four threaded adjustment pieces 50 and four respective contact pieces 60 of which two threaded adjustment pieces 50 and two respective contact pieces 60 are arranged in vertical direction and two threaded adjustment pieces 50 and two respective contact pieces 60 are arranged in horizontal direction.

With the help of each of said threaded adjustment pieces 40 and respective contact pieces 60 according to the presented another embodiment the distance between the adjustment flange 3 and the bearing shield 4 near said threaded adjustment piece 50 can be adjusted. In said adjustment procedure first the mounting bolts 38 of said adjustment flange 3 are slightly loosened to allow radial movement of the adjustment flange 3. Thereafter, one or more threaded adjustment pieces 50 are selected on sides where distance between the adjustment flange 3 and the bearing shield 4 is to be increased.

After this the adjustment screws 51 of each of said selected threaded adjustment pieces 50 are screwed and adjusted so that said adjustment screws 51 first contact a respective contact piece 60 in said adjustment flange 3 and then further move the adjustment flange 3 to an alignment position. Thereafter, the mounting bolts 38 of said adjustment flange 3 are tightened for securing said adjustment flange 3 to the alignment position.

Figure 10:
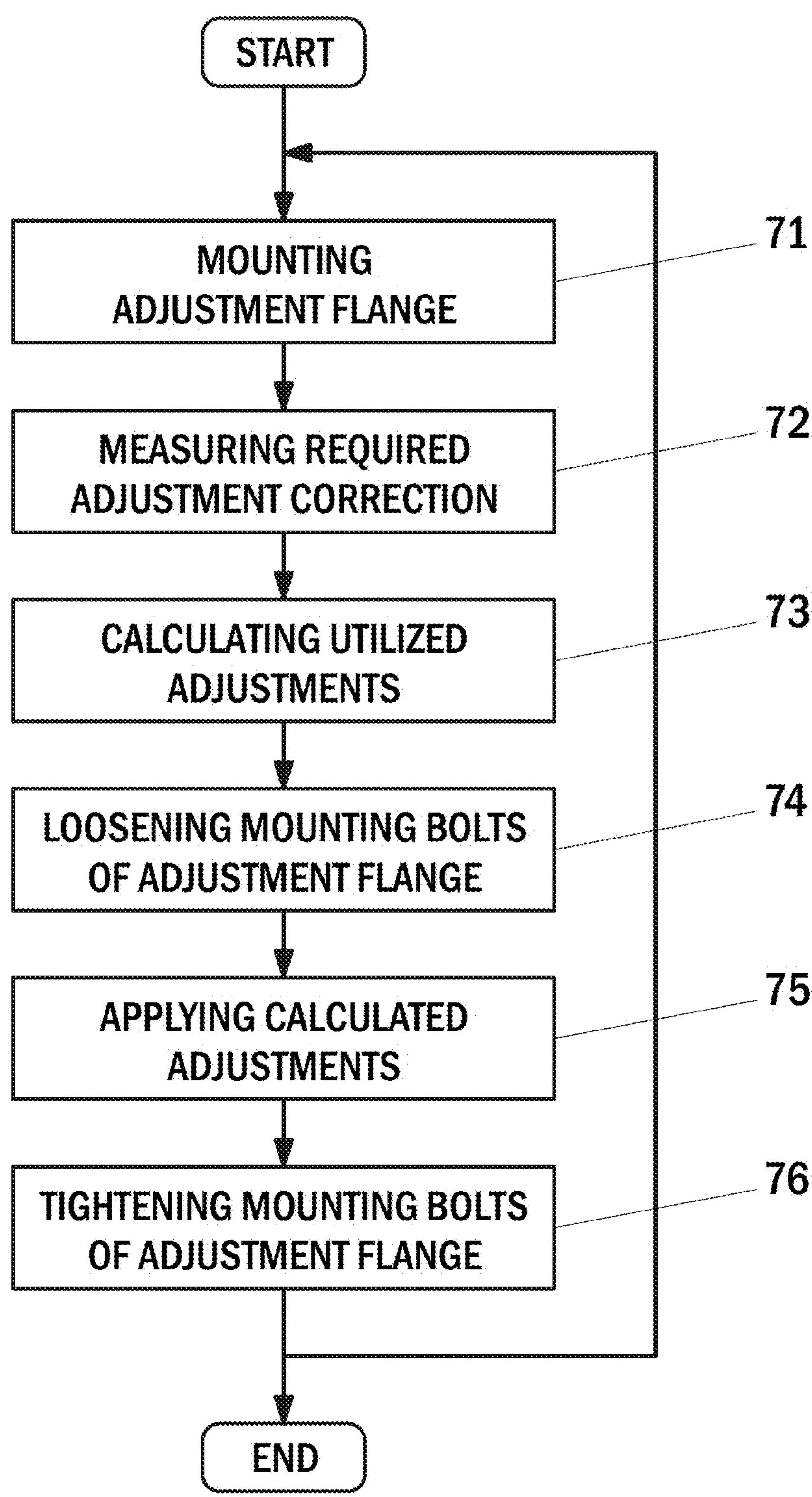
FIG. 10 illustrates a flow diagram of an embodiment of a method for aligning a load with an electric motor according to the present invention.

FIG. 10 illustrates a flow diagram of an embodiment of a method for aligning a load with an electric motor according to the present invention. In the method according to the presented embodiment, an adjustment flange 3 is first mounted 71 to said electric motor 1. Said adjustment flange 3 is mounted 71 to said first end plate 15 at the drive end D of the electric motor 1 with mounting bolts 38. Said mounting bolts 38 are used for securing a first annular end portion 31 of said adjustment flange 3 to the first end plate 15 through a number of holes 33 in said first annular end portion 31 to a number of threaded holes 8 in said first end plate 15. In the presented embodiment, as the next step, a required alignment correction is measured 72 from a shaft 7 of said electric motor 1. The measuring 72 may be carried out with the help of a laser based measurement and alignment system.

Thereafter, in the presented embodiment, the utilized adjustment pieces 40, 50 as well as applied adjustment for each utilized adjustment piece 40, 50 are calculated 73 based on said measured required alignment correction. The axial displacement of a screw is proportional to the rotation angle and the screw thread pitch. Thus, the required rotational angle of an individual screw can be calculated 73 based on said measured required alignment correction i.e. from the required radial displacement of said adjustment flange 3, 30. Similarly, the applied adjustments i.e. the displacements for each adjustment screw 41, 51 in each utilized adjustment piece 40, 50 are calculated 73 by simple trigonometric equations. Thus, as the needed alignment correction has been measured, a required rotation angle can be calculated for each adjustment screw 41, 51 based on the angular position of the adjustment screw 41, 51. In the presented embodiment, as the next step, the mounting bolts 38 of said adjustment flange 3 are slightly loosened 74 to allow radial movement of the adjustment flange 3.

Thereafter, in the presented embodiment, the calculated adjustments are applied 75 in each utilized adjustment piece 40, 50. The adjustments are applied 75 i.e. the adjustment screws 41, 51 of each of said utilized threaded adjustment pieces 40, 50 are screwed and adjusted in accordance with said calculated adjustments for moving said adjustment flange 3 radially so that said adjustment screws 41, 51 move the adjustment flange 3 to an alignment position. In the presented embodiment, as the next step, the mounting bolts 38 of said adjustment flange 3 are tightened 76 for securing said adjustment flange 3 to the alignment position. In an alternative embodiment of a method for aligning a load with an electric motor according to the present invention, as a last step, said at least three threaded adjustment pieces 40, 50 can be removed from said bearing shield 4 or from said adjustment flange 3.

With the help of the present invention there is provided an advanced and effective solution for aligning the motor with the load. The method according to the present invention can be used during the motor manufacturing and system integration. An additional advantage of the present invention is that the locking pins are not needed because the adjustment screws locate the adjustment flange properly for long term operation.

With the help of the present invention regular stiffness of the structures can be used and normal manufacturing tolerances can be applied with the motor and the load. The alignment solution according to the present invention can be utilized when the motor and the load are mounted together at factory facilities or in situ.

The solution according to the present invention provides an effective solution for aligning the motor with the load in applications where the mounting of the electric motor has to be carried out so that the supporting foundation is available only for the non-drive end of the electric motor.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims and their equivalents.

The invention claimed is:

1. An electric motor comprising:

a rotor comprising a shaft and a rotor core supported on the shaft;

a stator surrounding the rotor;

a motor frame surrounding the stator and including a first end plate at a drive end of said electric motor;

a bearing shield attached to said first end plate; and an adjustment flange mounted to said first end plate with mounting bolts, said adjustment flange comprising two annular end portions joined together with a number of axial beams, wherein a non-drive end of said electric motor is supported by a non-drive end supporting foundation, and a drive end of said electric motor is configured to be mounted together with a load with help of said adjustment flange, and wherein said electric motor further includes:

at least three threaded adjustment pieces fixed to said bearing shield or to said adjustment flange; and at least three threaded adjustment screws, each of said adjustment screws configured for being driven through a respective threaded adjustment piece and for moving said adjustment flange radially, and wherein said at least three threaded adjustment pieces comprise one threaded adjustment piece for each axial beam of said adjustment flange.

2. The electric motor of claim 1, wherein said at least three threaded adjustment pieces are fixed to said bearing shield or to said adjustment flange with the help of fixing screws.

3. The electric motor of claim 1, wherein said at least three threaded adjustment pieces are welded to said bearing shield or to said adjustment flange.

4. The electric motor of claim 1, wherein said at least three threaded adjustment pieces comprise eight threaded adjustment pieces.

5. The electric motor of claim 1, wherein said at least three threaded adjustment pieces are fixed to said bearing shield, and wherein said electric motor further includes at least three respective contact pieces fixed to the adjustment flange.

6. The electric motor of claim 1, wherein said at least three threaded adjustment pieces are fixed to said adjustment flange, and wherein said electric motor further includes at least three respective contact pieces fixed to said bearing shield, said contact pieces being arranged together with said at least three threaded adjustment pieces for adjustment of a distance between the adjustment flange and the bearing shield.

7. The electric motor of claim 1, wherein said adjustment screws are arranged as radial screws.

8. The electric motor of claim 7, wherein said adjustment screws are arranged as radial screws with a fine thread pitch.

9. A method for aligning a load with an electric motor, which includes:

a rotor having a shaft and a rotor core supported on the shaft;

a stator surrounding the rotor;

a motor frame surrounding the stator and including a first end plate at a drive end of said electric motor;

a bearing shield attached to said first end plate; and an adjustment flange mounted to said first end plate with mounting bolts, said adjustment flange comprising two annular end portions joined together with a number of axial beams, wherein a non-drive end of said electric motor is supported by a non-drive end supporting foundation, and a drive end of said electric motor is configured to be mounted together with a load with help of an said adjustment flange, and wherein said electric motor further includes:

at least three threaded adjustment pieces fixed to said bearing shield or to said adjustment flange; and at least three threaded adjustment screws, each of said adjustment screws configured for being driven through a respective threaded adjustment piece and for moving said adjustment flange radially, and wherein said at least three threaded adjustment pieces comprise one threaded adjustment piece for each axial beam of said adjustment flange, said method comprising:

mounting said adjustment flange to said electric motor;

measuring required alignment correction from the shaft of said electric motor;

calculating applied adjustment for each utilized adjustment piece based on said measured required alignment correction;

loosening the mounting bolts of said adjustment flange slightly to allow radial movement of said adjustment flange;

adjusting the adjustment screws of each of said utilized threaded adjustment pieces in accordance with said calculated adjustments for moving said adjustment flange radially; and tightening the mounting bolts of said adjustment flange for securing said adjustment flange.

10. The method of claim 9, wherein said required alignment correction is measured with the help of a laser-based measurement and alignment system.

11. The method of claim 9, wherein in said calculating a required rotational angle for each individual screw is calculated based on said measured required radial displacement of said adjustment flange.

12. The method of claim 9, wherein said method comprises:

removing said at least three threaded adjustment pieces from said bearing shield or from said adjustment flange.

* * * * *